Patented Aug. 26, 1947

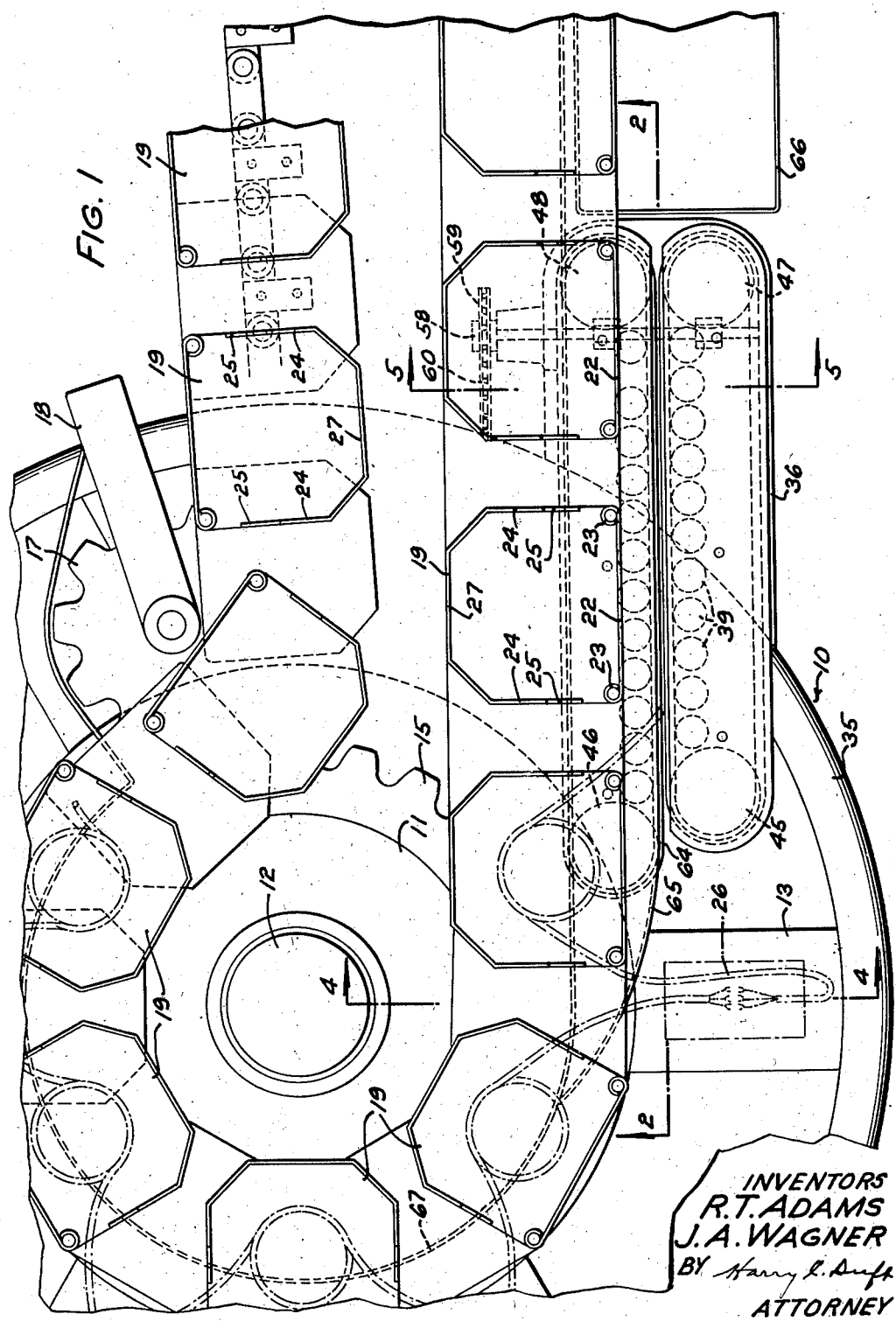

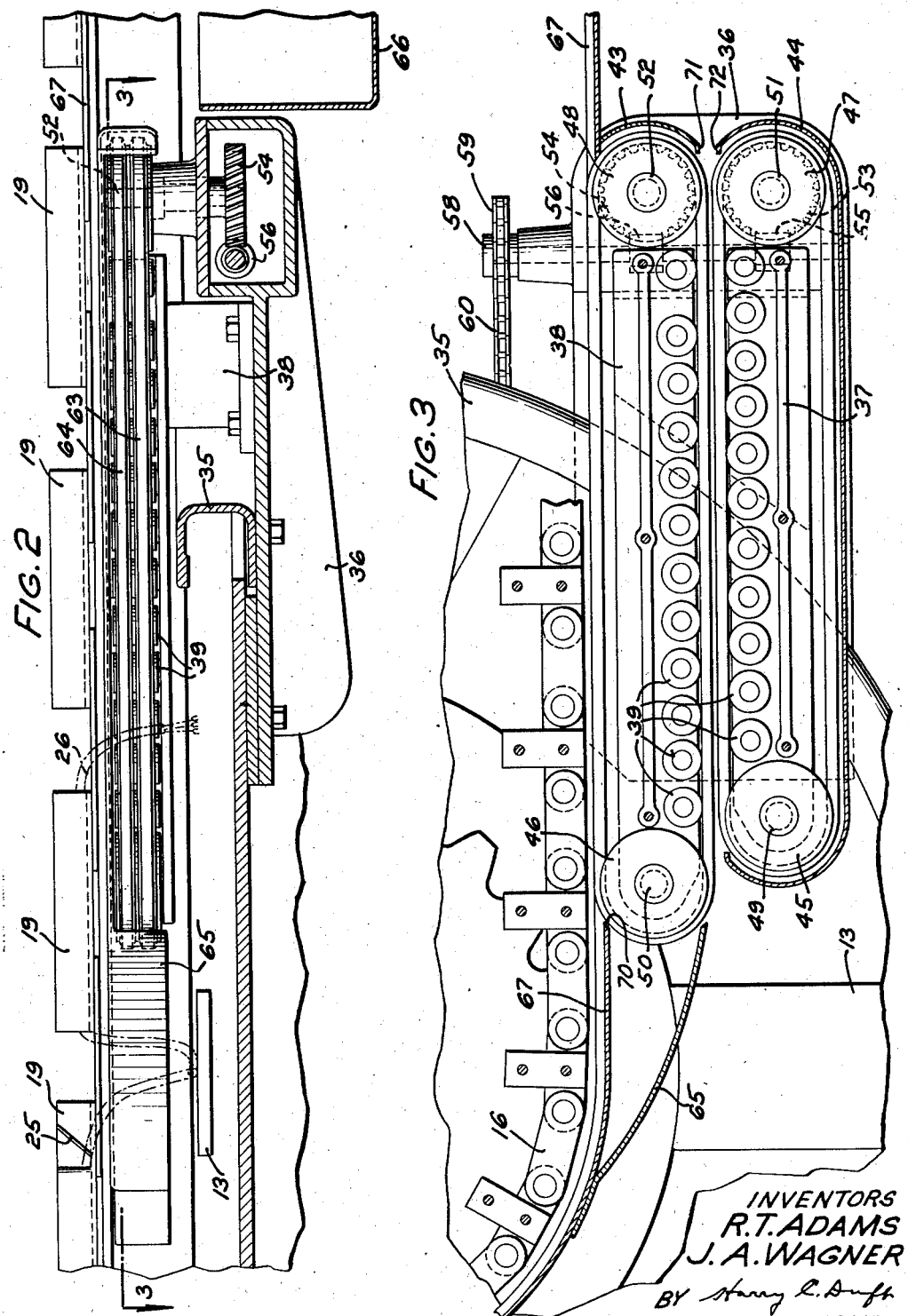

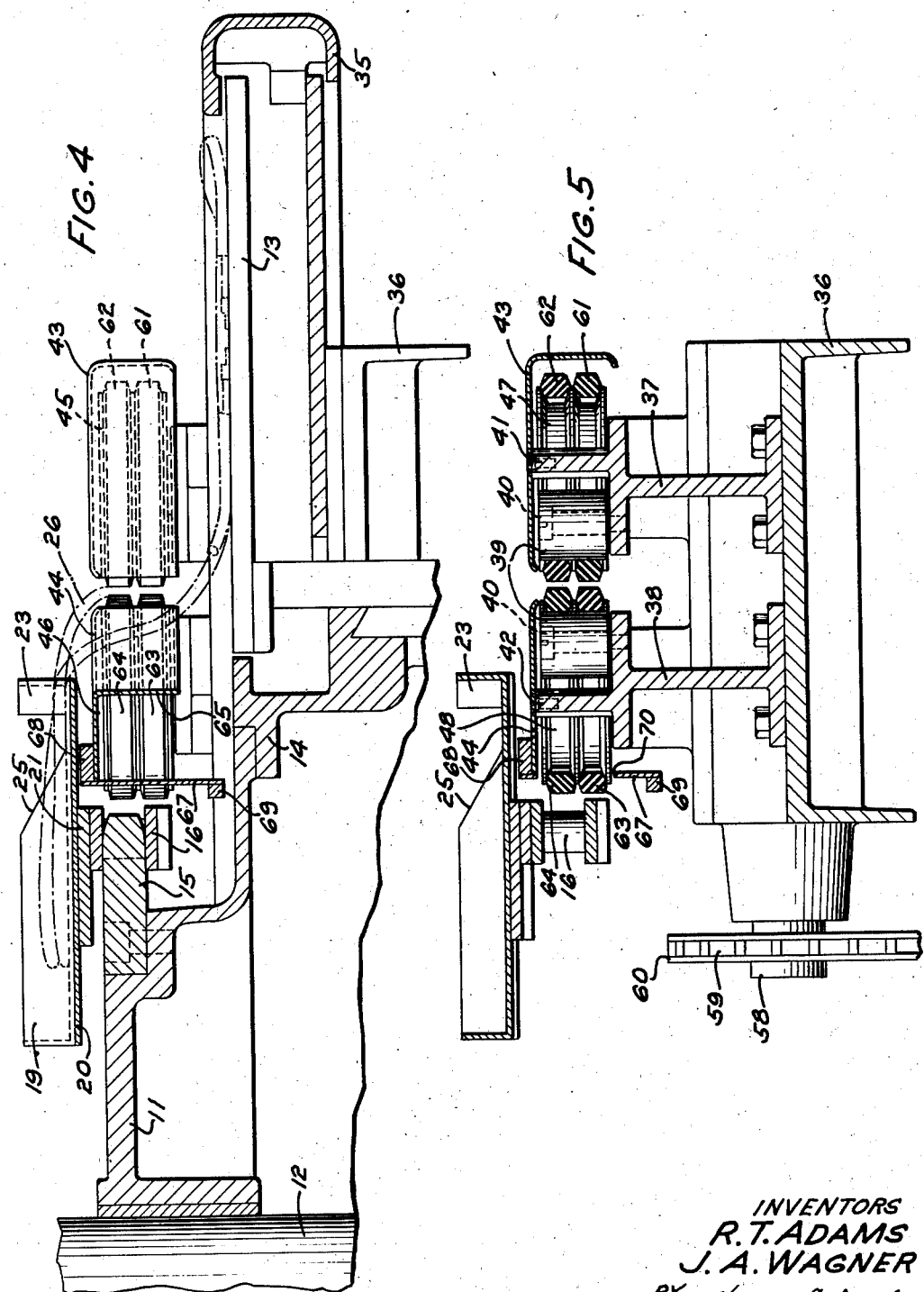

2,426,169

UNITED STATES PATENT OFFICE 2,426,169

CONVEYOR AND UNLOADING APPARATUS

Robert T. Adams, Baltimore, Md., and Julius A. Wagner, Cleveland Heights, Ohio, assignors to Western Electric Company, Incorporated, New York, N. Y., a corporation of New York Application January 11, 1945, Serial No. 572,416

9 Claims. (Cl. 198—185)

This invention relates to a conveyor and an unloading apparatus therefor, and more particularly to a conveyor for conveying cords during the processing thereof and to a mechanism for unloading processed cords from the conveyor.

It is an object of the present invention to provide a simple and efficient mechanism for handling flexible articles.

In accordance with one embodiment of the invention, a conveyor is provided for receiving cordage, upon which operations are to be performed, where lengths of cordage are coiled in pans carried by the conveyor with a looped portion of the cordage extending between the pans on the conveyor in position to have operations performed upon them. The conveyor carries the cordage in the pans with a length of cordage hanging therefrom to an unloading device comprising cooperating belts driven at high speed in parallel relation one to another in position to receive a severed length of the cordage and withdraw the coil of cordage rapidly from the pan and direct the severed length of cordage to a container.

A complete understanding of the invention may be had by reference to the following detailed description when considered in conjunction with the accompanying drawings, wherein Fig. 1 is a fragmentary plan view of a cord processing machine having a conveyor traveling around it to properly position cords which are to be operated upon by the processing machine and showing the unloading device adjacent the processing machine;

Fig. 2 is a vertical sectional view taken substantially along the line 2—2 of Fig. 1 in the direction of the arrows;

Fig. 3 is a fragmentary plan sectional view taken substantially along the line 3—3 of Fig. 2 in the direction of the arrows and showing details of construction of the unloading apparatus;

Fig. 4 is a transverse vertical sectional view taken through a portion of the processing machine and the conveyor taken substantially along the line 4—4 of Fig. 1 in the direction of the arrows; and Fig. 5 is a transverse vertical sectional view through the unloading portion of the apparatus taken substantially along the line 5—5 of Fig. 1 in the direction of the arrows.

Referring to the drawing, wherein like reference numerals designate the same parts throughout the several views, particular reference being had to Figs. 1 and 4, it will be seen that the conveyor system is adapted to cooperate with a cord processing machine 10 of the type disclosed in detail in the co-pending application of R. T. Adams and J. A. Wagner, Serial No. 572,414, filed January 11, 1945, and adapted to be supplied with cordage by an apparatus such as that disclosed in the co-pending application of J. A. Wagner, Serial No. 572,417, filed January 11, 1945. The portion of the cord processing machine 10 as disclosed herein, comprises a turret 11 rotatable about a center post or bearing post 12 and carrying a plurality of plates 13 in a circular path to a number of processing tools (not shown). The turret 11 which rotates about the bearing post 12 carries a framework 14 which serves to support the plate 13 and the turret has a sprocket ring 15 suitably attached to it for supporting and driving a link chain 16. The link chain 16 comprises the driving and supporting element of a conveyor which extends to the right of Fig. 1 to a suitable end support (not shown), and is then directed back to a guide sprocket 17 which will cause it to mesh with the sprocket ring 15 and be driven thereby. The sprocket 17 is mounted on a suitable bracket 18 and is positioned to direct the chain 16 into engagement with the sprocket ring 15 so that throughout most of the circumference of the turret 11, the chain 16 will encircle and engage the sprocket ring 15. Mounted at spaced intervals on the chain 16 are a plurality of pans 19. The pans 19 are fixed to plates 20 which are in turn mounted upon brackets 21 suitably fixed to alternate links of the chain 16. Each of the pans 19 is provided with a front wall 22 which terminates in a rounded abutment 23 formed by curling a sheared out portion of side walls 24—24 upon themselves at the ends of the front wall. The side walls 24—24 are cut away as shown at 25 to facilitate withdrawal of cordage 26 which has been coiled in the pan and the side walls 24 have portions thereof, bent to join with a rear wall 27.

The cord processing machine is provided with an annular framefork 35 which encloses the outer ends of the plates 13. This framework is stationary and has fixed to it a support bracket 36 (Figs. 4 and 5) on which there are mounted a pair of irregularly shaped castings 37 and 38. The castings 37 and 38 extend parallel one to another and each carries a plurality of rollers 39 along the edge of it adjacent to the other casting. These rollers 39 are freely rotatable on stud shafts 40 threaded into castings 37 and 38. The castings 37 and 38 are provided with central vertically extending flanges 41 and 42 which serve to support covers 43 and 44 for enclosing the rollers 39 and double pulleys 45, 46, 47 and 48. The pulleys 45 and 46 are freely rotatable upon stud shafts 49 and 50 fixed to the castings 37 and 38, respectively, whereas the pulleys 47 and 48 are fixed to stud shafts 51 and 52 journalled in the castings 37 and 38. The stud shafts 51 and 52 carry gears 53 and 54 in mesh with oppositely formed worm gears 55 and 56, respectively, which serve to drive the gears 53 and 54 and through the stud shafts 51 and 52 and to impart rotation to the pulleys 47 and 48. The worm gears 55 and 56 are mounted upon a drive shaft 58 which carries a sprocket 59 driven by a chain 60. The chain 60 may be driven by any suitable driving means (not shown) to rotate the shaft 58 at a relatively high rate of speed to drive belts 61, 62, 63 and 64. The belts 61 and 62 are positioned in the grooves of the double pulley 47 and the double pulley 45 whereas the belts 63 and 64 are mounted in the grooves of double pulleys 48 and 46 and the belts will be held closely adjacent one another on their inner course by the rollers 39 in such a manner that a length of cordage severed from a continuous length thereof in the cord processing machine 10 and guided to position between the belts by a guide member 65 will be withdrawn from the pan 19 and transferred rapidly to a container 66 positioned adjacent to the end of the courses of the belts.

The guide member 65 is formed integrally with the cover 44 and extends from the point where the cover terminates to expose the inner course of belts 63 and 64, to a point where it engages a guard member 67. The guard member 67 is attached to the cover 64 as shown in Figs. 4 and 5 and is reinforced and supported by cooperating bars 68 and 69 attached to the annular framework 35, being broken away as shown at 70 in the area where the belts and pulleys extend into its path. The covers 43 and 44, as shown most clearly in Figs. 1 and 5, have the edges of their adjacent top surfaces spaced apart to form a passage extending from approximately the center line of the minor course of the belts 63 and 64 to approximately the center line of the inner course of the belts 61 and 62 and the top edges of the covers are bent down slightly to position closely adjacent the belts. At the right ends of the covers 43 and 44 (Fig. 3) guide members 71 and 72, respectively, are fixed to the covers and extend into close proximity to the belts to prevent a cord from sticking to one of the belts and being entangled in the unloading apparatus.

In the operation of the apparatus the plates 13 travel around the turret of the cordage processing machine at a relatively low rate of speed and, as clearly described in the co-pending application, double ended cords are formed. After the cords have thus been formed, they may be conveyed out of the processing machine and to a container 66 for receiving a supply of them by the mechanism described herein. In the processing machine 10, the cordage 26 is cut into lengths and terminals are attached to the ends of the lengths. As a plate 13 having a cord loosely connected thereto, passes under the left end (Fig. 1) of the castings 37 and 38, the guide member 65 will guide a free end of the cordage into position between adjacent courses of the belts 61, 62, 63 and 64 and since the belts are traveling at a high rate of speed, the cordage will be gripped between the belts and dragged rapidly out of the pan 19 and snapped into the container 66 as the severed length of cordage leaves the belts at the point where they diverge.

What is claimed is:

1. An unloading device for a processing machine handling lengths of flexible material comprising a pair of belts having adjacent courses traveling in the same direction and in diverging paths, stationary means for guiding an end portion only of a length of flexible material into position to be gripped by said belts, and a container adjacent to the diverging paths of said belts for receiving the lengths of flexible material unloaded from the processing machine.

2. A cord conveyor and unloader comprising a link chain, means for driving said chain, pans on said chain for receiving coiled lengths of cordage and carrying each length with an end portion extending from the pan, and a pair of belts driven at a high speed relative to the speed of the drive means for the chain and positioned relative to the link chain to engage the end portions of said lengths of cordage for withdrawing lengths of cordage from the pans.

3. The combination of a conveyor carrying coiled lengths of flexible material with an end of the length of material extending from the conveyor in a predetermined path with an unloading device for the conveyor comprising means positioned adjacent to the path of said end for engaging and gripping said end, and means for driving said engaging means and gripping means to pull a length of material from the conveyor.

4. A combination of a cord conveyor carrying coiled cords with an end of a cord extending from the conveyor in a predetermined path with an unloading device comprising cooperating driven members positioned adjacent to the path of said end for engaging and gripping said end between them, and means for driving said engaging and gripping means at high speed relative to the speed of said conveyor to pull a cord from the conveyor.

5. The combination with a conveyor for lengths of flexible material with an end of each length of material extending from the conveyor of an unloading device comprising a support bracket, a pair of sets of pulleys on said bracket, an endless belt engaging each set of pulleys, said belts having adjacent courses positioned relative to said conveyor to engage and grip the ends of said flexible material, means for driving a pulley in each set to advance the adjacent courses of the belts in the same direction, and means for guiding the end of a length of material on the conveyor to position between the adjacent courses of the belts.

6. The combination with a conveyor for lengths of flexible material with an end of each length of material extending from the conveyor of an unloading device comprising a support bracket, a pair of sets of pulleys on said bracket, an endless belt engaging each set of pulleys, said belts having adjacent courses positioned relative to said conveyor to engage and grip the ends of said lengths of flexible material, means for driving the conveyor at a predetermined speed, means for driving a pulley in each set of pulleys at a rate of speed faster than the speed of the conveyor, and means for guiding the end of a length of material on the conveyor to position between the adjacent courses of the belts.

7. A cord unloading apparatus comprising two sets of belts each set comprising a plurality of belts, pulleys for driving said belts and for positioning the belts in each set in spaced relation axially with respect to each other, means for supporting said pulleys in position to support the belts with adjoining courses of the belts traveling in the same direction, stationary means for guiding an end portion only of a cord to position between said courses, and means cooperating with said guiding means to enclose substantially all of the belts and pulleys except the adjacent courses of the belts.

8. A cord unloading apparatus comprising two sets of belts with a plurality of belts in each set, pulleys for driving said belts and for positioning the belts in each set in spaced relation axially with respect to each other, means for supporting said pulleys in position to support the belts with adjoining courses of the belts traveling in the same direction, stationary means for guiding an end portion only of a cord to position between said courses, and a container positioned adjacent to the point where the adjoining courses of the belts diverge for receiving cords pulley off by the belts.

9. A cord unloading apparatus comprising two sets of belts with a plurality of belts in each set, pulleys for driving said belts and for positioning the belts in each set in spaced relation axially with respect to each other, means for supporting said pulleys in position to support the belts with adjoining courses of the belts traveling in the same direction, stationary means for guiding an end portion only of a cord to position between said courses, a container positioned adjacent to the point where the adjoining courses of the belts diverge for receiving cords pulled off by the belts, and guide means for disengaging the cords from the belts adjacent the container.

ROBERT T. ADAMS.
JULIUS A. WAGNER.

REFERENCES CITED

The following references are of record in the file of this patent:

UNITED STATES PATENTS

| Number | Name | Date |
|---|---|---|
| 1,759,105 | Evans | May 20, 1930 |
| 1,904,885 | Seeley | Apr. 18, 1933 |
| 2,208,287 | Cochrane | July 16, 1940 |
| 1,183,996 | McMahan | May 23, 1916 |
| 1,491,282 | Abbott et al. | Apr. 22, 1924 |
| 1,507,871 | Van Orman | Sept. 9, 1924 |
| 1,661,316 | Van Steenkiste et al. | Mar. 6, 1928 |

FOREIGN PATENTS

| Number | Country | Date |
|---|---|---|
| 23,049 | Germany | Feb. 10, 1906 |
| 158,046 | Switzerland | Jan. 16, 1933 |